May 20, 1930.  Z. W. WICKS  1,759,819
GAS PURIFIER
Filed Jan. 28, 1925
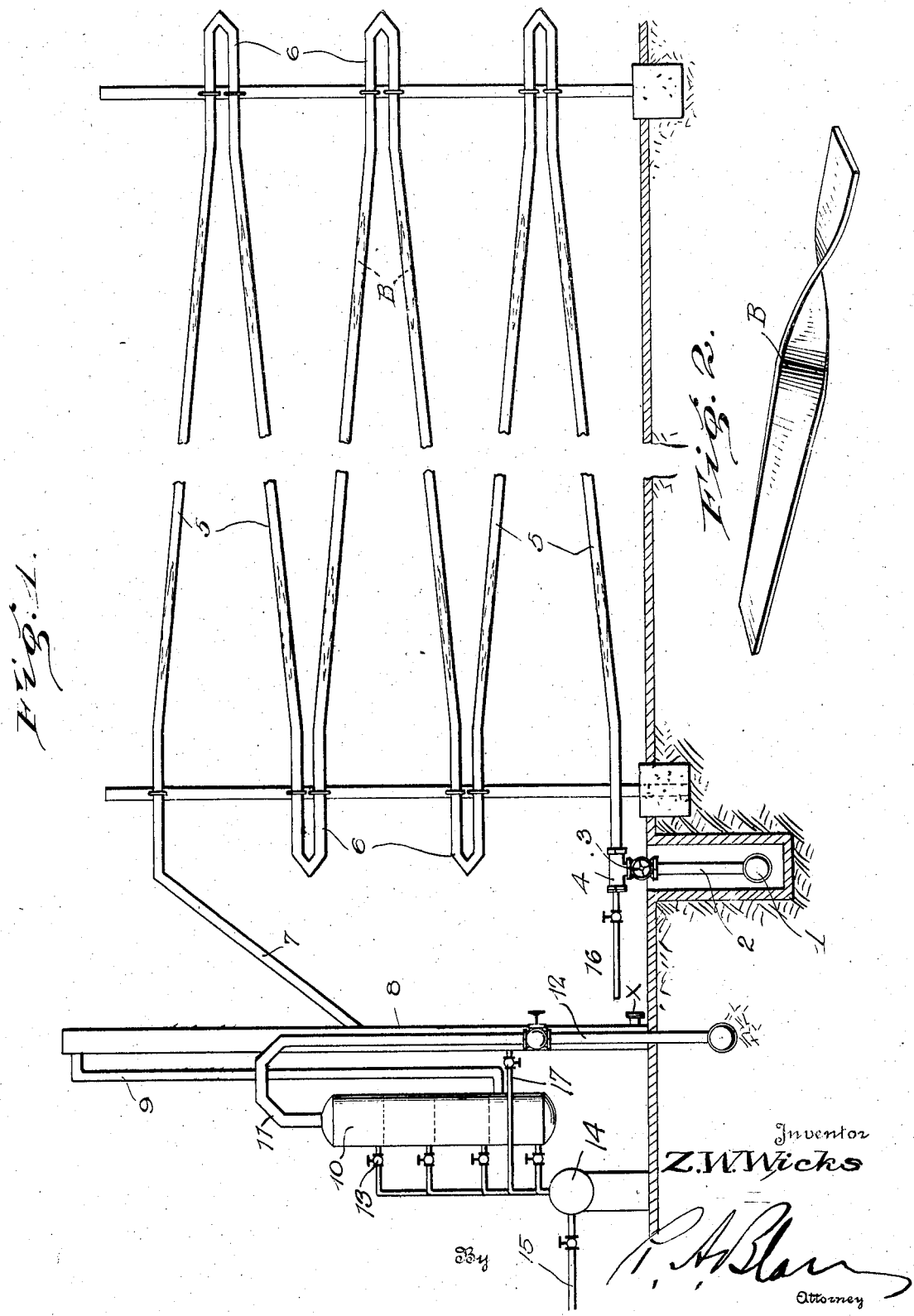

UNITED STATES PATENT OFFICE

ZENO W. WICKS, OF FORT WORTH, TEXAS

GAS PURIFIER

Application filed January 28, 1925. Serial No. 5,399.

(GRANTED UNDER THE ACT OF MARCH 3, 1883, AS AMENDED APRIL 30, 1928; 370 O. G. 757)

This specification relates to gas purifiers or scrubbers for extracting solid matter, water, or other impurities from natural, artificial, or other mixtures of gas.

By way of illustration, the invention may be described hereinafter with relation to its application to the removal of carbon dioxide from helium bearing natural gas previous to the process of extracting the helium therefrom.

An object of the invention is to provide an apparatus of the character described adapted to extract one or more of the constituents of a gas or liquid mixture in such a manner as to permit the recovery of those constituents whether they be gas or liquid.

Another object of the invention is to provide an apparatus, the construction of which is such that there is a repeated commingling of a gas and washing mixture passing therethrough.

A further object of the invention is to provide a reliable and efficient apparatus adapted to be operated under pressure or vacuum and capable of handling any gas or liquid mixture in such a manner as to permit separation of the gas and liquid mixture into its constituents.

With the above and other objects in view the invention consists in the construction, combination and arrangement of parts as will be described more fully hereinafter.

Reference is to be had to the accompanying drawings forming a part of this specification, in which like reference characters indicate corresponding parts throughout the several views, and in which Figure 1 is a semi-diagrammatic side elevational view of such parts of the complete apparatus as is necessary to fully understand the invention, and Figure 2 is a detailed view of one of the baffles employed in the pipe system or scrubber.

Referring more particularly to the drawings, the gas to be treated for the extraction of carbon dioxide or the like is permitted to flow from a main 1, either by pressure or vacuum, through a pipe 2 and control valve 3 to a lower one of a series of zigzag inclined pipes 5, which pipes are connected by V-shaped elbows 6, causing an abrupt change in direction of flow of the material through the pipes, and constituting a portion of the scrubbing means for the gas. The gas passing through the pipes 5 is treated by injecting a stream of washing mixture, such as caustic soda and water, or such other chemical as may be suitable, through the ejecting nozzle, forming part of the pipe 16, connected to the fitting 4, to which the gas inlet pipe 2 is also connected.

This mass of washing mixture and gas begins to form itself into strata as soon as it leaves the fitting 4, due to the tendency of the gas to pass through the mixture forming the upper stratum, while the mixture forms the lower stratum. It is not the purpose of this invention, however, to have the mass of washing mixture and gas move through the pipes in the strata formation, but rather to have the gas that is to be purified pass through the washing mixture at a number of predetermined points in its course of travel through the scrubber. One of the means that assists in the accomplishment of this is baffles B placed within the pipes at predetermined intervals so as to invert the gas and mixture that have been formed into strata, as above stated, causing the gas that has accumulated on the top to be carried to the bottom, and the mixure, formerly on the bottom, to be carried to the top. Upon completion of this reversing movement, the gas will rise again to the top to be once more directed to the bottom by the next succeeding baffle.

These baffles, shown in detail in Figure 2, are preferably strips of metal twisted to form a complete half turn, and are placed in the pipes so as to cause an alternate whirl of the mass of washing mixture and gas about every twenty feet. As they are preferably flat pieces of metal and substantially the same width as the diameter of the pipe, the gas will flow over the top of that portion of the baffle towards which it is approaching to be conducted to the underside of that portion of the baffle from which it passes. Action on the washing mixture is the same, but in reverse order.

It will be observed from the drawings that as the mass progresses through the scrubber, it comes into contact with a number of abrupt angles formed in the elbows 6 connecting the several inclined sections of pipe, as well as angles formed by the joining of the pipes and elbows. These angles cause turbulence between the washing mixture and gas, due to the momentum of the washing mixture, it being heavier than the gas. As the mass comes into contact with these angles, it forcibly strikes against the wall of the scrubber causing an intimate commingling of the mixture and gas, because of the reason just stated. It is desirable to have the elbows formed with these abrupt angles to provide this additional commingling of elements, as more efficient cleansing is thus established than would be the case were the elbows shaped in a gradual bend. Also additional surfaces are provided for this commingling by inclining the pipe forming the scrubber in the direction of progression of flow of the mass through the scrubber.

The mass forced through the scrubber is thus thoroughly agitated in the form of a fog, mist, or emulsion, and as it passes out the uppermost one of the series of pipes 5 of the scrubber, it moves down the inclined conduit 7 to a stack pipe or trash collector 8 where the heavier matter of the washing mixture and foreign matter in the mass descends by gravity and is carried off through the pipe connection x. The lighter portion of the washing mixture and gas rises and passes out at the upper end of the stack pipe through a pipe 9 to a stagnation container or mixture trap 10, where the remaining washing mixture is trapped in any desirable manner, and the purified gas passes out through pipe 11 to a pipe 12 leading to a separation plant, not shown, where the helium is extracted.

The washing mixture is withdrawn from the trap 10 through suitable valves 13 and is collected in a manifold 14 from whence it is drawn through pipe 15 by a suitable pump, not shown, to be again injected through pipe 16 to the nozzle fitting 4. Connection is made from the trap 10 to the collector 8 through a pipe 17 to conduct any gases that might be carried out of the trap with the washing mixture again to the collector where they will rise and again pass through the trap together with the newly entering material.

It will thus be seen that the present invention provides a simple and practical apparatus particularly adapted for removing certain gaseous constituents from a natural gas and simultaneously scrub and purify the same prior to its separation.

The apparatus may be inexpensively manufactured, assembled and installed and it is adapted to accomplish among others, all the objects and advantages herein set forth.

The invention herein described may be manufactured and used by or for the Government of the United States for governmental purposes without the payment to me of any royalty thereon or therefor.

What I claim is:—

In an apparatus of the character described, in combination, a series of zigzag pipes connected to a suitable supply of gas at one end and a storage receptacle at the opposite end, said pipes being inclined in the direction of progression of flow therethrough, means for injecting a cleaning fluid at the inlet with sufficient velocity to agitate the gases, and a series of spiral plates within said zigzag pipes, said plates being periodically spaced at long intervals whereby the stream of mixture is inverted first in one direction and then in the other.

Signed at Washington, District of Columbia, this first day of December, 1924.

ZENO W. WICKS.